(12) United States Patent
Lee (10) Patent No.: US 10,021,609 B2
(45) Date of Patent: Jul. 10, 2018

(54) METHOD AND SYSTEM FOR SELECTING A COMMUNICATION INTERFACE

(71) Applicant: ARCADYAN TECHNOLOGY CORPORATION, Hsinchu (TW)

(72) Inventor: Chih-Fang Lee, Tainan (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 36 days.

(21) Appl. No.: 15/287,543

(22) Filed: Oct. 6, 2016

(65) Prior Publication Data

US 2018/0007598 A1 Jan. 4, 2018

(30) Foreign Application Priority Data

Jul. 4, 2016 (TW) .............................. 105121098 A (51) Int. Cl.
*H04W 36/06* (2009.01)
*H04W 48/16* (2009.01)
(Continued)

(52) U.S. Cl.
CPC ............ *H04W 36/06* (2013.01); *H04L 43/10* (2013.01); *H04W 36/30* (2013.01); *H04W 48/16* (2013.01);
(Continued)

(58) Field of Classification Search
CPC ..... H04W 36/06; H04W 36/30; H04W 48/16; H04W 48/20; H04W 72/04; H04W 84/12; H04W 88/08
(Continued)

(56) References Cited

U.S. PATENT DOCUMENTS

2005/0215266 A1  9/2005  Tsien et al.
2011/0195712 A1*  8/2011  Mucke ................. H04W 48/16
                                                          455/434
(Continued)

FOREIGN PATENT DOCUMENTS

CN          103959679 A      7/2014
WO     WO 03/001742 A1      1/2003
(Continued)

OTHER PUBLICATIONS

European Patent Office, Patent Search Report dated Apr. 19, 2017.

*Primary Examiner* — Jae Y Lee
*Assistant Examiner* — Jean F Voltaire
(74) *Attorney, Agent, or Firm* — Li & Cai Intellectual Property (USA) Office (57) ABSTRACT

The disclosure is related to a method and a system for selecting a communication interface. The method is applicable to a local area network including multiple access points. A main access point is first selected. The main access point acquires every access point's information within a local area network. The information relates to the access points that are in an idle state or not performing a critical task. A target antenna can be selected for performing a specific function. For example, the target antenna can be used to scan for the channels specified in dynamic frequency selection. After that, the scan result may result in changing channels. Through the above mechanism, the resources in every AP within the LAN can be adequately used, and the performance of wireless communication can be effectively improved.

13 Claims, 6 Drawing Sheets

(51) Int. Cl.
*H04W 48/20* (2009.01)
*H04W 72/04* (2009.01)
*H04W 36/30* (2009.01)
*H04L 12/26* (2006.01)
*H04W 84/12* (2009.01)
*H04W 88/08* (2009.01)

(52) U.S. Cl.
CPC ....... *H04W 48/20* (2013.01); *H04W 72/0486* (2013.01); *H04W 84/12* (2013.01); *H04W 88/08* (2013.01)

(58) Field of Classification Search
USPC .................................................. 370/329–332
See application file for complete search history.

(56) References Cited

U.S. PATENT DOCUMENTS

| | | | | |
|---|---|---|---|---|
| 2013/0084812 | A1* | 4/2013 | Churei | H04W 52/028 455/73 |
| 2014/0376392 | A1* | 12/2014 | Hegde | H04W 48/16 370/252 |
| 2015/0358810 | A1* | 12/2015 | Chao | H04W 4/001 455/418 |
| 2016/0165617 | A1 | 6/2016 | Sakamoto et al. | |
| 2016/0278007 | A1* | 9/2016 | Gokhale | H04W 76/10 |

FOREIGN PATENT DOCUMENTS

| | | |
|---|---|---|
| WO | WO 2007/089961 A1 | 8/2007 |
| WO | WO 2014/194492 A1 | 12/2014 |

\* cited by examiner

METHOD AND SYSTEM FOR SELECTING A COMMUNICATION INTERFACE

BACKGROUND OF THE INVENTION

1. Field of the Invention

The present invention is generally related to a method and a system for selecting a communication interface, in particular to the method and system adapted to a local area network comprising a plurality of wireless access points, and to select one communication interface among the access points instructed by the system.

2. Description of Related Art

When a system operates within a specific wireless frequency band, the specified frequency band may overlap with the signals with higher priority. According to some related regulations, some types of signaling bands should be avoided. For example, the local area network, e.g. WiFi™, generally owns high priority to use 5 GHz band; however, the use for weather radar or military radar owns a priority higher than WiFi within the same frequency band. In addition, a mechanism of dynamic frequency selection (DFS) should be initiated.

When the conventional network device, such as an access point (AP), is powered on, it should scan the signaling channels before operation to check if any signal is operated under regulation of dynamic frequency selection. The signal under DFS regulation is such as a radar signal. If the network device finds radar signals in the channels, the network device should mark the occupied channels as unavailable, and transfer the signals to be transmitted to unoccupied channels.

However, notwithstanding the above regulation and the special need, the network device may still operate for other purposes by means of the scanning process. For example, the process of scanning signals in the channels can be used to avoid the channels with great noise so as to achieve higher performance.

SUMMARY OF THE INVENTION

One of the tasks of the conventional wireless network device is to scan signaling channels by one of the antennas in an idle state. Any available channel can be found and used to avoid the channels occupied by radar signals or the channels with too much noise. This disclosure is related to a method and a system for selecting a communication interface for performing a specific purpose by firstly retrieving information regarding the access points within a local area network. Therefore, a target antenna is selected to scan signals within a specific frequency band, especially to select a target channel under regulation of dynamic frequency selection.

According to one of the embodiments, the method is applicable to a local area network. In the method, a master access point is selected from the access points in the LAN, and used to acquire operating information of each of the access points. A target interface can be selected from the communication interfaces of the access points based on the operating information collected by the master access point. This target antenna is configured to scan signals in some frequency bands.

A device for performing the above process to select one of the communication interfaces of the multiple access points in the LAN is such as a master access point. The master access point receives and stores the operating information for each of the access points. The master access point issues instruction for asking the access points in the LAN to send their operating information. The operating information includes the information regarding the communication interface(s) for every access point. One of the communication interfaces is selected to be a target interface, e.g. an antenna. It is noted that the communication interface generally indicates the wireless device's antenna.

The signals within one or more specific frequency bands are such as the signals in channels under regulation of dynamic frequency selection (DFS) scanned by the selected target antenna. Further, the target antenna may also scan the background noise. When the master access point confirms the signals scanned by the target antenna are those the system should avoid, the master access point instructs every access point to switch its operating channel.

The system for selecting the communication interface for specific purpose is applicable to a local area network that is disposed with a plurality of access points. The access point may include one or more communication interfaces, e.g. a wireless network interface and Bluetooth communication interface. The master access point is selected from the plurality of access points. The master access point includes a memory unit used to store the instructions executed by a control module for performing the method for selecting a communication interface.

The instructions stored in the memory unit include instruction for collecting operating information of multiple access points in the LAN, instruction for selecting a target antenna based on the operating information regarding the communication interface of the multiple access points, and instruction for using the target antenna to scan signals in some frequency bands. In addition, instruction for instructing the access points to switch their operating channels for the master access point is included.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a technology that is able to find out an available target interface of the network nodes within a local area network for performing a function specified by a system. The network node is such as an access point (AP). The access point can be network equipment acting as a hot spot within a wireless LAN, a bridge, a gateway, or a router. According to an embodiment, reference is made to FIG. 1 showing a schematic diagram depicting a local area network applying a system for selecting a communication interface.

Figure 1:
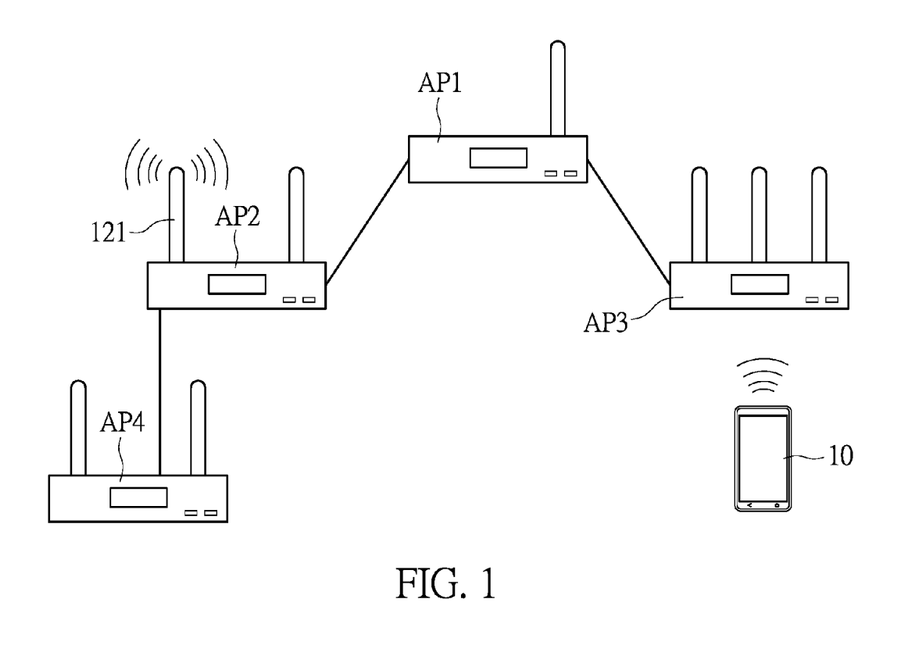
FIG. 1 shows a schematic diagram depicting a system for selecting a communication interface in a local area network according to one embodiment of the present invention.

In the local area network shown in FIG. 1, a first access point AP1, a second access point AP2, a third access point AP3 and a fourth access point AP4 constitute a topology of the LAN. The access points are interconnected via wired or wireless connections. The connection can be implemented by a wireless network, e.g. WiFi™, Ethernet, or a power-line communication (PLC). It is noted that, in practice, the aforementioned number of APs and the topology do not limit the scope of the present invention.

Coverage formed by the multiple access points AP1, AP2, AP3 and AP4 constitutes a wireless local area network. The access points AP1, AP2, AP3 and AP4 render a service allowing a terminal device 10 in the LAN to establish connection with an external network or to reach a specific destination. In the system for selecting a communication interface, a master access point is defined among the access points AP1, AP2, AP3, and AP4 for collecting information from the access points, and giving instructions. The master access point also administrates the rest of the access points. The master access point continuously or regularly acquires operating information of each of the access points in the LAN through the packets. The operating information essentially includes connectivity among the access points, network throughput, and particularly operating status for every communication interface of each of the access points. It is noted that the communication interface indicates an antenna and its RF circuit disposed in an access point.

Based on the mechanism rendered by the system for selecting the communication interface in accordance with the present invention, the master access point is allowed to determine one of the communication interfaces of the access points in the LAN. The communication interface is such as a WiFi™ antenna, Bluetooth™ antenna or the like. In an example, an antenna 121 of the second access point AP2 is exemplified as a target antenna. One of the reasons to specify this target antenna 121 because the antenna is in an idle state, or it is being used for unimportant work.

Figure 2:
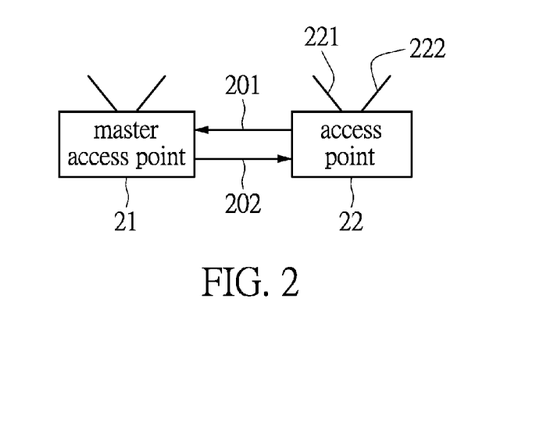
FIG. 2 shows a schematic diagram describing connectivity between a master access point and an ordinary access point for implementing the method for selecting a communication interface according to one embodiment of the present invention.

Reference is made to FIG. 2 schematically showing the connectivity between a master access point and an ordinary access point. The connection between the master access point 21 and the access point 22 establishes a channel implemented by a wired or a wireless connection. The channel embodies a receiving channel 201 and a transmitting channel 202. The master access point 21 receives operating information of the access point 22 via the receiving channel 201. The operating information is in regard to the information of a first antenna 221 and a second antenna 222 of the access point 22, by which the master access point selects one of the communication interfaces, e.g. one of the antennas, which is in an idle state, or the communication interface is not operating an important task, to be the target antenna.

Since the first antenna 221 or the second antenna 222 is selected to be the target antenna, the selected antenna may not be connected with any terminal device, or operate the unimportant task. It is noted that one of the unimportant tasks for an antenna is to broadcast packets in a routine work when it is in idle state. The antenna not operating an important task can be selected to be the interface. The selected antenna allows the master access point 21 to check if radar signals exist in the channels by scanning the channels under regulation of dynamic frequency selection. Alternatively, the master access point 21 can classify WiFi signals or non-WiFi noise via the target antenna.

Figure 3:
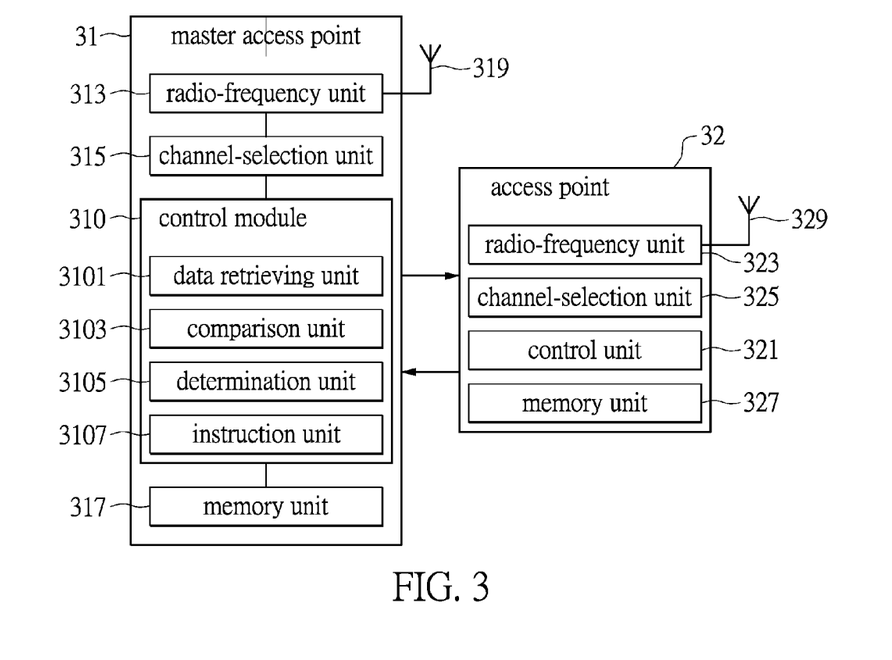
FIG. 3 shows a block diagram describing circuitry implementing the system in one embodiment of the present invention.

Reference is next made to FIG. 3 showing circuit blocks of the master access point and the other access point embodying the system for selecting the target channel in one embodiment of the present invention.

The shown functional blocks of the master access point 31 or the access point 32 can be the modules implemented by software, hardware or in combination thereof. In an exemplary case of the invention, the master access point 31 can be the same as the ordinary access point 32, but they operate different roles in the system. However, in an exemplary embodiment, the master access point 31 may be equipped with proprietary functions. The diagram shows they all render various software or hardware-implemented functional modules.

The master access point 31 may act as a wireless network node. The master access point 31 includes a control module 310 used to process signals inside the device. The master access point 31 includes an unlimited number of communication interfaces, e.g. the wireless interfaces. Further, the master access point 31 includes an antenna 319 and its proprietary radio-frequency unit 313 for conducting a communication protocol, a channel-selection unit 315 used to decide a specific channel for its antenna 319, and a memory unit 317 used to record operating information for every access point, and the regular data. The access point 32 is such as a node having a number of communication interfaces. The access point 32 includes a control unit 321, an antenna 329 (unlimited number), and a radio-frequency unit 323 for conducting a specific communication protocol, a channel-selection unit 325 used to decide the operating channel for the antenna 329 and its radio-frequency unit 323, and a memory unit 327.

When the master access point 31 is in operation, it establishes connection with the other access point 32 via a communication interface. The communication interface includes the antenna 319 and radio-frequency unit 313 of that area used to receive operating information from the access point 32. The control module 310 then transforms the data received from the data retrieving unit 3101 into the essential information. The comparison unit 3103 compares signals from the access point 32 with a threshold. The determination unit 3105 determines if any communication interface of the access point 32 is available. The instruction unit 3107 allows the master access point 31 to issue an instruction to the access point 32. The instruction is such as asking the access point 32 to send information, and instruct the access point 32 to switch the antenna to operate over a specific channel.

According to one of the embodiments of the present invention, the method is performed upon a topology including a plurality of access points, and a master access point selected from those access points. The topology can be, but not limited to, a star type, a ring type or a mesh type. The communication interface acts as the interface, e.g. the target antenna, that is used to scan specific target signals.

The system is essentially applied to a local area network having a plurality of access points, and each of the access points includes one or more communication interfaces. When one of the access points is selected to be the master access point, the memory unit of the master access point is used to collect data from other access points. The memory unit also stores instructions executed by the control module for performing the method for selecting the communication interface. The instructions include instruction for receiving operating information of the access points within the local area network; instruction for selecting a target antenna based on the operating information of every communication interface; instruction for using the target antenna to scan signals within a frequency band; and instruction for instructing every access point to switch the operating channel.

Figure 4:
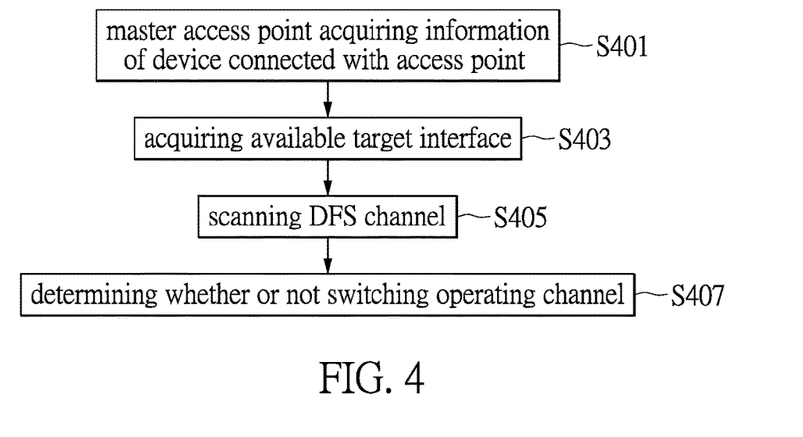
FIG. 4 shows a flow chart describing the method for selecting a communication interface according to one embodiment of the present invention.

FIG. 4 shows a flow chart describing the method according to one of the embodiments of the present invention.

In the process, the master access point first collects operating information from every access point or node within the local area network. The operating information especially includes the information of the terminal device connected with one of the access points. The operating information is also the information regarding the data throughput of any antenna of each of the access points. Further, the operating information includes the status of whether the access point is connected with any terminal device (step S401). The master access point can therefore determine if the access point is operating any crucial task via the antenna and its RF circuit, so as to acquire the available communication interface based on the information. The communication interface acts as a target interface, e.g. the antenna in an idle state or not operating an important task (step S403). The master access point is configured to issue an instruction, for example, for asking the target antenna to scan signals in a specific frequency band. For example, the target antenna is configured to scan the signals of channels under regulation of dynamic frequency selection, or background noise (step S405). After that, the master access point is able to determine the channel that the system should avoid and the other available channels based on the scanning result. In an exemplary embodiment, the target antenna indicates the antenna and proprietary RF circuit of one of the access points. An available antenna and RF circuit are selected to be the target antenna, and the target antenna is driven to scan signals in a frequency band. The master access point determines if the rest of the access points should switch the operating channel to another channel, e.g. a target channel, according to the scanning result (step S407).

Figure 5:
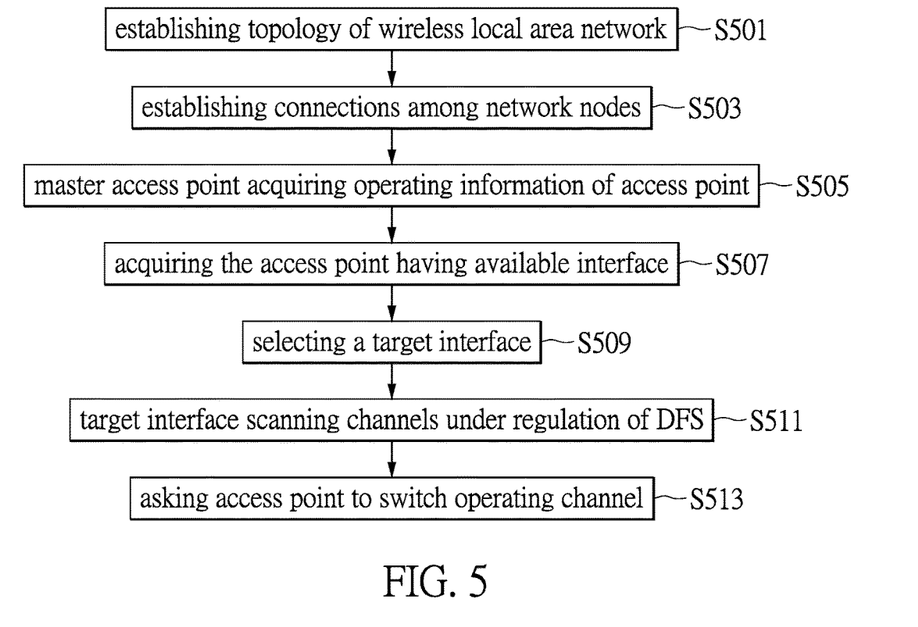
FIG. 5 shows a flow chart describing the method in one further embodiment of the present invention.

According to another embodiment of the present invention, in the process shown in FIG. 5, a topology of a LAN with network nodes is first formed (step S501), and a network system is therefore established. The network nodes are interconnected via various interfaces, e.g. the antennas (step S503). The network node is a form of an access point that is not limited to any specific network equipment. For example, the connections established among the nodes are based on wireless or wired connections. The wireless connection is implemented by WiFi™ or Bluetooth™ communication protocol. The wired connection is such as Ethernet, or power line communication (PLC). The access point may have one or more sets of antennas and RF circuits. In some cases, one of the antennas and its RF circuit is in operation, and the other antenna and RF circuit may be in idle state at the same time. The idle set may be used by the system.

The network system has a master access point. The master access point can be manually designated by an administrator, or selected from a plurality of access points in the LAN based on a specific rule. In one embodiment, the access points in the LAN exchange their packets, and can acknowledge there is an access point serving a service of allocating IP addresses or network identifications to other access points from the broadcasted packets. The service provided by the access point is such as DHCP (Dynamic Host Configuration Protocol) service. This access point may act as a master access point that administrates the access points in the LAN.

In one other embodiment of the present invention, the master access point is decided based on the hardware information collected from the access points in the LAN. The hardware information is any of MAC (Media Access Control) address, system uptime, neighbor list, processor capability, and network throughput, or any combination thereof. In a mechanism of automatic selection of the master access point, a new master access point can be re-designated based on the broadcast packets if the original master access point is replaced or eliminated.

Next, in the process shown in FIG. 5, the system allows the master access point constantly or regularly to acquire the operating information from the access points, optionally including the terminal devices, in the same LAN (step S505). The master access point acquires status of every antenna and its RF circuit of the access point and the channel delivering the antenna signals based on every connection established among the access points and the nodes. Therefore, any idle communication interface or the interface not operating an important task can be obtained by the master access point, so as to have an available communication interface (step S507). The master access point then selects the available access point with the available communication interface, and the interface acts as a target antenna for scanning the background signals (step S509).

When the access point with the idle antenna or available signaling channel is found, the master access point issues a scanning instruction to ask the access point with the antenna in an idle state to drive the antenna to conduct a specific purpose. For example, the master access point instructs the access point to scan signals in a specific frequency band under regulation of dynamic frequency selection (step S511). For example, the available antenna and RF circuit are used to check if radar signals are in the channel. If radar signals are found in the channel, the master access point issues instruction to instruct the access point(s) in the LAN to switch channels. The channel prohibited by the regulation of DFS should be avoided (step S513).

The frequency bands of military use or prohibition around 5.25 to 5.35 GHz, and 5.47 to 5.725 GHz are partially overlapped with the frequency bands designated for wireless LAN. The signals may interfere with each other in the overlapped frequency bands. The statutory rules are that the system should be equipped with a DFS function to ensure the frequency bands used by the radar are free from interference by others. DFS mechanism allows the wireless network devices to dynamically switch its operating channel to avoid the prohibited channels, e.g. the radar occupied channels in specific frequency bands. The wireless network device may be required to continuously detect the radar signals under some circumstances for acquiring the available channels. Then the device can avoid the prohibited channels.

The system requires the master access point to instruct the other access points to operate wireless signals other than the prohibited channels when those channels are found to have the signals such as radar signals under DFS.

In another embodiment of the present invention, the idle antenna can be used to scan background noise for determining the channels which are without noise. The access point can operate over the channel without noise or noise lower than a threshold.

It is noted that the communication interface can be used by the system for the specific purpose when it operates an unimportant task. The regular operations such as routine scanning and broadcasting, and maintaining connection with the terminal device can be regarded as unimportant works.

Figure 6:
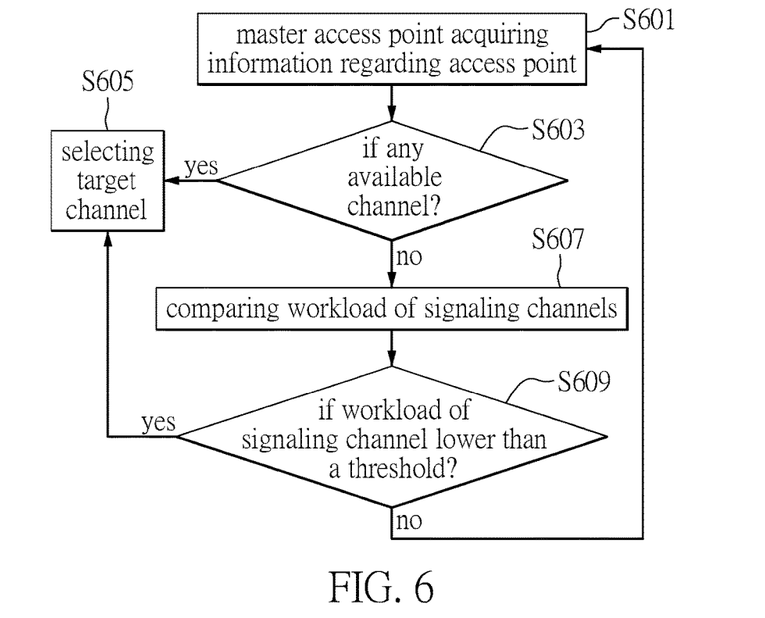
FIG. 6 shows one more flow chart describing the method in one further embodiment of the present invention.

Reference is made to FIG. 6 showing a flow chart describing the master access point constantly or regularly retrieving information of the access points. The information is stored to a memory of the master access point, such as in step S601. In step S603, through the operating information collected from the access points, the master access point determines whether or not any communication interface in idle state or operating an unimportant task is found to be available (step S603). The communication interface can be selected as the target antenna when it is in an idle state. The target antenna may be the one selected from multiple communication interfaces (step S605). The target interface, determined by the master access point, can be the communication interface not operating an important task. Further, the target interface can be one selected from the multiple communication interfaces. The target interface generally indicates a target antenna for operating the work instructed by the system (step S605).

In step S603, if the master access point determines that no communication interface is found to be available according to the information collected from the access points in the LAN, that means none of the communication interfaces is in an idle state or not operating an important task, but are in uninterruptable and important operation. The master access point compares the workloads, e.g. the data throughput, of the communication interfaces of every access point (step S607). The communication interface with lowest workload is exemplarily selected to be the target interface.

In the process, the target interface is determined by judging the workloads with respect to the communication interfaces and the signaling channels of the access points. A threshold is provided to be a reference for determining the target interface. The threshold allows the master access point to determine if the workload of the communication interface is lower than the threshold, or is the lowest (step S609). The master access point instructs the communication interface whose workload is actually lower than the threshold to perform the task according to the system's instruction. The process repeats the step S601 when there is not any interface with a lower workload than the threshold. In step S601, the master access point re-selects the target interface based on the information collected from the access points in the LAN. When any communication interface is with a lower workload than the threshold, such as in step S605, the master access point designates a target interface, e.g. the antenna to perform the specific work.

The aforementioned judgment can be used to determine an available communication interface with a lower workload, or to check if any communication interface is with a workload lower than a threshold. The communication interface with lower or the lowest workload can be configured to be the target interface. It is noted that the order of the above steps is not limited to the process for designating the target interface/antenna.

The workload for every communication interface indicates throughput determined through signals received by the master access point via every communication interface from every access point. The data throughput counted by software, e.g. the tool installed in the master access point, can be assessed in the judgment within a specific time of period. Further, according to one of the embodiments, the throughput occurring in the signaling channels under the regulation of DFS can be obviated when the workloads for all channels of the access points in the LAN are counted. Still further, the throughput occurring in the channels having noise can also be obviated in the process of counting the workload.

Figure 7:
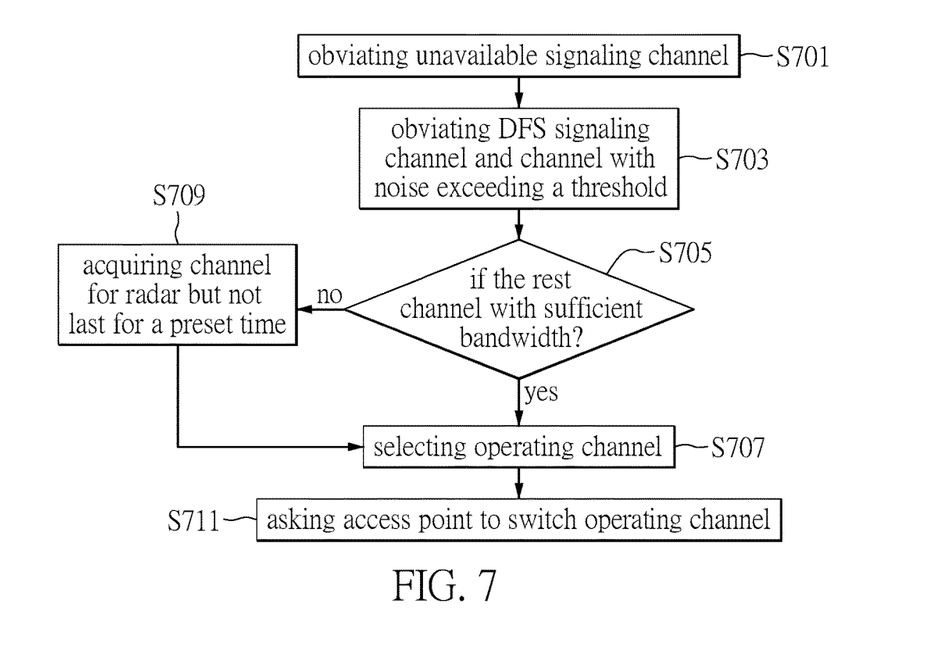
FIG. 7 shows a flow chart depicting the process of switching channels in the method according to one embodiment of the present invention.

In FIG. 7, a flow chart describes the process allowing the access points to switch channels according to the scanning result made by the target interface selected by the master access point.

In this embodiment of the present invention, the master access point acquires the available communication interface in an access point based on the signals collected from the access points in the LAN. The available communication interface acts as a target antenna for scanning signals within a specific frequency channel, and the scanning result is referred to as the basis for considering switching the channel. In step S701, the antennas and related channels not in idle state or not operating an important task are to be obviated. The channels with background noise are scanned under regulation of dynamic frequency selection, and the channels should be obviated when the noises exceed a threshold (step S703). In step S705, the master access point determines if the rest of the channels have sufficient bandwidth, for example a bandwidth threshold is used to make this judgment. The master access point selects one of the channels having sufficient bandwidth as a target channel to be switched (step S707). Otherwise, when there is not any channel with sufficient bandwidth qualified to be the operating channel, such as in step S709 the master access point acquires the DFS channel, e.g. the channel for radar, to be the operating channel when the signals under DFS do not last for a preset time. After that, the operating channel is successfully selected (step S707). After selecting the operating channel to be switched at the step S707 or the step S709, asking the access points to switch the operating channel (step S711), for example, the master access point issues an instruction directly to the one or more access points among the multiple access points managed by the master access point, and then the instruction is transmitted to the rest of the multiple access points through the one or more access points, to ask the all access points to switch their operating channels with respect to the target antenna through the instruction, such that all access points are turned to operate over the operating channel selected.

Figure 8:
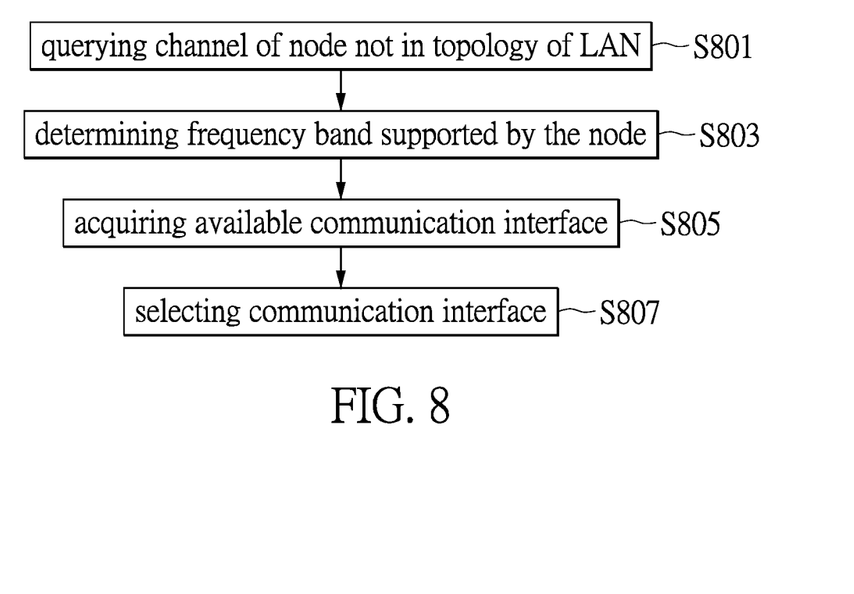
FIG. 8 shows a flow chart describing the method for selecting a communication interface in one further embodiment of the present invention.

In one further embodiment, reference is made to FIG. 8; the system first collects information relating the nodes capable of performing the system's instructions in the same topology of a local area network. The system then queries whether or not any communication interface of the nodes is not under the management of the master access point (step S801). For example, a Bluetooth module in a node operating in a specific frequency band may not be counted in the operation of the wireless local area network managed by the master access point. The master access point can find out the frequency bands, e.g. around 2.4 GHz or 5 GHz, supported by the nodes in the LAN according to the packets collected from those nodes (step S803), so as to check if any node has the communication interface unsupported by the topology of LAN and further to evaluate any possibility of having an available communication interface thereon (step S805). If the master access point finds any available communication interface, the communication interface or signaling channel not in the management of the topology can act as the target interface/channel (step S807).

The master access point designates a target antenna in the local area network to perform the work instructed by the system. For example, the target antenna can be used to scan the signals in the frequency band under the regulation of dynamic frequency selection for all channels; or to scan the background noise. When the background noises are scanned in the channel under regulation of dynamic frequency selection and the noise exceeds a threshold, the master access point switches the operating channel to another channel with sufficient bandwidth. One of the objectives of the above embodiments in accordance with the present invention is to allow the whole local area network to function in the channels without interference.

Figure 9:
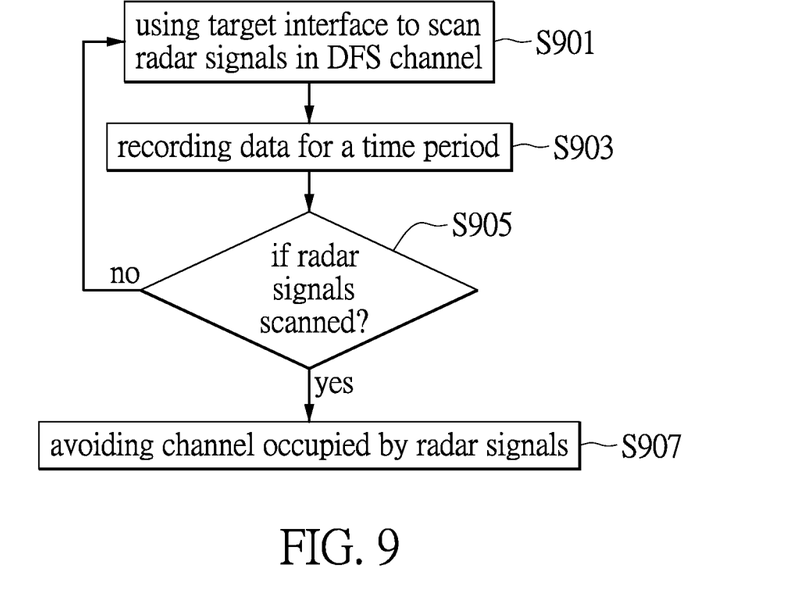
FIG. 9 shows a flow chart describing the process of DFS to select a target channel in the method according to one embodiment of the present invention.

FIG. 9 shows a flow chart depicting the process of selecting the target channel according to one further embodiment in accordance with the present invention.

In step S901, the target antenna is employed to scan the radar signals in the DFS channels. In step S903, the data collected from a period of time is recorded. The system, e.g. the master access point, in step S905, determines if radar signals are found within this period of time. If there radar signals are not found within the time, for example lasting 30 minutes, the channel under scanning can be used for other purposes, and the process repeats the above steps. If radar signals are scanned in the channel within the period of time, for example 30 minutes, such as in step S907, the master access point issues instruction asking other access points to avoid the channel occupied by the radar signals; or to switch the operating channel to another channel with sufficient bandwidth.

Figure 10:
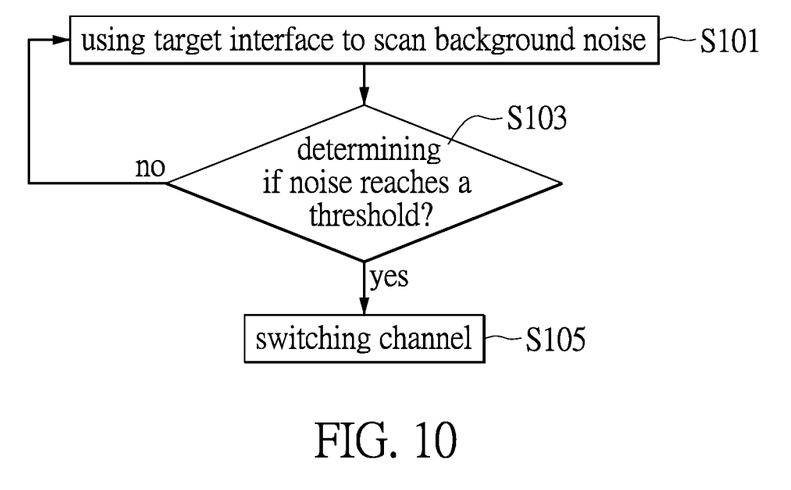
FIG. 10 shows one further flow chart describing the process of switching channels in one embodiment of the present invention.

FIG. 10 shows a flow chart describing the target antenna applied to scan the background noise by the system. In step S101, the interface acting as the target antenna in the LAN is used to scan background noise, no matter whether the noise is in the frequency band of WLAN, or in other frequency bands. In step S103, the master access point determines if the quantity of noise reaches a preset threshold based on the scanning result made by the target antenna. If the noise does not yet reach the threshold, back to step S101, the system can operate over the original channels. Otherwise, in step S105, the master access point asks the access points in the LAN to avoid the channel occupied by the noise and switch to other channels, especially the channel with sufficient bandwidth.

Thus, according to the above embodiments in accordance with the present invention, the disclosed method and system for selecting a communication interface for the specific purpose instructed by the system is applied to the LAN having a plurality of access points. A master access point is defined in the LAN. The master access point designates a target antenna from the access points based on the information collected from those access points. The target antenna is configured to perform the function instructed by the system. The system efficiently utilizes the resources of the LAN, and especially makes the devices in the LAN avoid the prohibited channels for enhancing the performance of the whole system.

It is intended that the specification and depicted embodiment be considered exemplary only, with a true scope of the invention being determined by the broad meaning of the following claims.

What is claimed is:

1. A method for selecting a communication interface, comprising the following steps:
   (a) receiving operating information of multiple communication interfaces of multiple access points within a local area network;
   (b) determining whether any of the multiple communication interfaces is in an idle state or not operating an important task based on the operating information regarding the multiple communication interfaces of the multiple access points, in response to determining at least one of the multiple communication interfaces is in an idle state or not operating an important task, selecting one of the at least one communication interface in the idle state or not operating an important task as a target antenna and performing the step (e), and in response to determining none of the multiple communication interfaces is in an idle state or not operating an important task, performing the step (c);
   (c) comparing multiple workloads of the multiple communication interfaces and signaling channels of the multiple access points according to the operating information to select at least one communication interface having a lower workload;
   (d) determining whether a workload of each of the at least one communication interface having the lower workload is lower than a workload threshold, in response to determining a workload of the at least one communication interface having the lower workload is lower than the workload threshold, selecting one of the at least one communication interface having the workload lower than the workload threshold as the target antenna, and in response to determining a workload of the at least one communication interface having the lower workload is not lower than the workload threshold, returning to the step (a); and
   (e) using the target antenna to scan signals in a specific frequency band.

2. The method as recited in claim 1, wherein, a master access point is selected from the multiple access points in the local area network; and the master access point receives and stores the operating information for each of the access points, and issues an instruction to ask the access points within the local area network to send their operating information regarding every communication interface thereof to the master access point, so as to allow the master access point to select the target antenna.

3. The method as recited in claim 2, wherein the target antenna is used to scan for signals of channels that are under regulation of dynamic frequency selection, or for signals of channels with background noise above a noise threshold.

4. The method as recited in claim 3, wherein, when the signals scanned by the target antenna contain radar signals under the regulation of dynamic frequency selection, the master access point switches the operating channel to another channel with sufficient bandwidth.

5. The method as recited in claim 4, wherein, when the radar signals under the regulation of dynamic frequency selection have been found, the master access point further determines whether or not the radar signals have still been found within a time interval; the master access point switches the operating channel to another channel with sufficient bandwidth if the radar signals have still been found within the time interval.

6. The method as recited in claim 3, wherein, when the background noise is scanned in the channel and the noise exceeds the noise threshold, the master access point switches the operating channel to another channel with sufficient bandwidth.

7. The method as recited in claim 3, wherein the master access point selects one communication interface in the idle state from the access points, and/or the communication interface not operating an important task, to be the target antenna.

8. The method as recited in claim 1, wherein the workload for every communication interface indicates throughput of signals received by the master access point for every communication interface from every access point.

9. The method as recited in claim 1, wherein the target antenna is one of the antennas selected from the access points.

10. A system for selecting communication interface, adapted to a local area network, comprising:
 a plurality of access points disposed in the local area network, each of the access points includes one or more communication interfaces; a master access point is selected from the access points, and the master access point includes a memory unit used to store instructions executed by a control module for performing a method for selecting a communication interface for the specific purpose, the instructions comprising:
 (a) an instruction for receiving operating information of multiple communication interfaces of the multiple access points within the local area network;
 (b) an instruction for determining whether any of the multiple communication interfaces is in an idle state or not operating an important task based on the operating information of the multiple communication interface, in response to determining at least one of the multiple communication interfaces is in an idle state or not operating an important task, selecting one of the at least one communication interface in the idle state or not operating an important task as a target antenna and performing an instruction (e), and in response to determining none of the multiple communication interfaces is in an idle state or not operating an important task, performing an instruction (c);
 (c) the instruction for comparing multiple workloads of the multiple communication interfaces and signaling channels of the multiple access points according to the operating information to select at least one communication interface having a lower workload;
 (d) an instruction for determining whether a workload of each of the at least one communication interface having the lower workload is lower than a workload threshold, in response to determining a workload of the at least one communication interface having the lower workload is lower than the workload threshold, selecting one of the at least one communication interface having the workload lower than the workload threshold as the target antenna, and in response to determining a workload of the at least one communication interface having the lower workload is not lower than the workload threshold, returning to the instruction (a);
 (e) the instruction for using the target antenna to scan signals within a frequency band; and
 (f) an instruction for instructing every access point to switch operating channels.

11. The system as recited in claim 10, wherein the target antenna is one of the antennas selected from the access points.

12. The method as recited in claim 2, wherein the step (e) comprises issuing an instruction directly to one or more access points among the multiple access points from the master access point and then the instruction is transmitted to the rest of the multiple access points from the one or more access points, to ask the multiple access points to switch their operating channels with respect to the target antenna through the instruction.

13. The system as recited in claim 10, wherein the instruction for instructing every access point to switch operating channels is performed by: instructing one or more access points among the multiple access points by the master access point to switch operating channels with respect to the target antenna, and instructing the one or more access points to require other access points to switch operating channels with respect to the target antenna.

\* \* \* \* \*